J. JANUSONIS.
PROTECTING COVER FOR STOVES.
APPLICATION FILED JULY 31, 1920.

1,370,113.

Patented Mar. 1, 1921.

Inventor
Jonas Janusonis
By his Attorney
George C. Heinick

UNITED STATES PATENT OFFICE.

JONAS JANUSONIS, OF BOSTON, MASSACHUSETTS.

PROTECTING-COVER FOR STOVES.

1,370,113.      Specification of Letters Patent.      Patented Mar. 1, 1921.

Application filed July 31, 1920. Serial No. 400,371.

*To all whom it may concern:*

Be it known that I, JONAS JANUSONIS, a citizen of Lithuania, residing at South Boston, county of Suffolk, and State of Massachusetts have invented certain new and usefulful Improvements in Protecting-Covers for Stoves, of which the following is a specification.

The present invention appertains to protecting covers for stoves, such as are used upon ordinary kitchen stoves or the like for protecting the stove plate against overflowing grease, milk and the like.

It is the object of the invention to provide a cover of this type which is provided with pot holes adapted to be more or less closed by a plurality of rings for supporting pots of various sizes, each of said holes being guarded by suitable flanges against the overflow of fat, grease or milk.

A further object of the invention is to provide a cover of this character which allows a melting or liquefaction of fat or the like while protected against the direct influence of the fire in order to remove the danger of catching fire or losing its taste by burning.

With the foregoing and other objects in view, which will appear as the description proceeds, the invention resides in the combination and arrangement of parts and in the details of construction hereinafter described and claimed; it being understood that changes may be made in the precise embodiment of the invention herein disclosed within the scope of what is claimed without departing from the spirit of the invention.

The invention is illustrated in the accompanying drawing, wherein—

Figure 1:
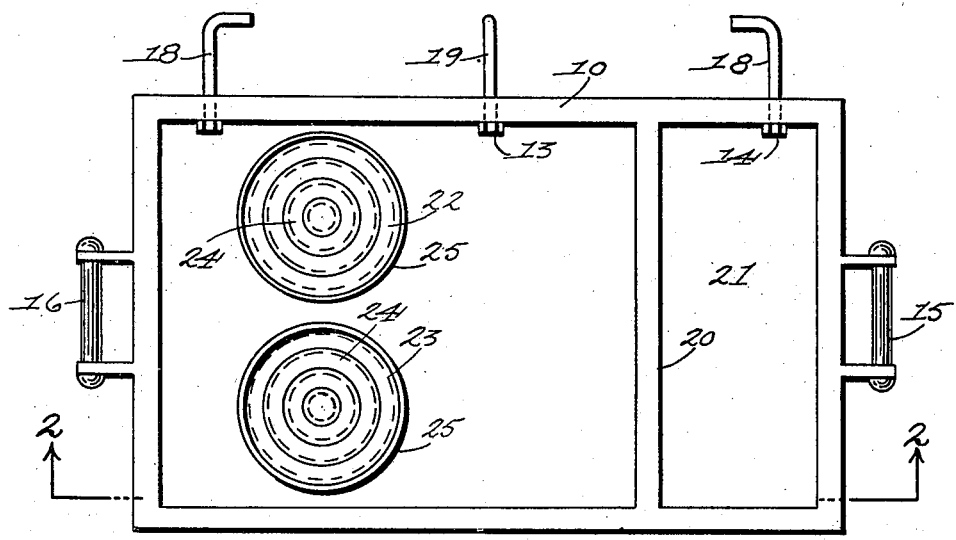
Figure 2:
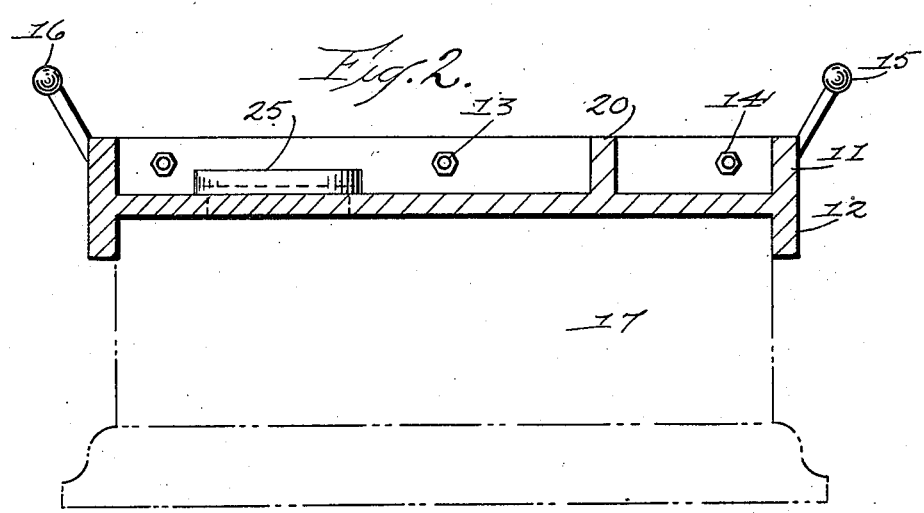

Figure 1 is a top plan view of a cover constructed according to the present invention, and Fig. 2 is a longitudinal section on line 2—2 of Fig. 1.

The cover 10 has marginal flanges 11 and 12 extending above and below the stove plate proper and is provided with handles 15 and 16 permitting a convenient removal of the plate from a stove 17. Hooks 18 and bolts 19 carrying nuts 13 and 14 respectively allow a securing of the plate to the stove, and a partition wall 20 forms a vessel 21 in which fat or the like may be melted.

Two pot holes 22 and 23 are provided in the cover each adapted to be closed by a plurality of rings 24 having depressed flanges, for supporting larger or smaller pots, as the case may be, over the fire holes of the stove. Each of said holes is surrounded by an elevated marginal flange 25 acting as a protection of the plate against the overflow of grease, fat or milk, causing the well known obnoxious smell.

Having thus described my invention, what I claim as new and desire to secure by Letters Patent of the United States is as follows—

A stove cover of the character described comprising in combination, a plate provided with a number of pot holes, upstanding and downturned flanges on said plate for holding the same on a stove, a partition wall transversely arranged between the upstanding flanges thereof for forming a fat melting vessel, means for securing said plate to the top of a stove, a plurality of rings fitting into said pot holes for allowing the support of pots of varying diameters in said holes above the fire holes of a stove, and upstanding marginal flanges surrounding each pot hole, substantially as described and for the purpose set forth.

In testimony whereof I have affixed my signature.

JONAS JANUSONIS.